(12) United States Patent
Brousse et al.

(10) Patent No.: US 10,501,861 B2
(45) Date of Patent: Dec. 10, 2019

(54) ELECTROCHEMICAL DEVICES WITH CURRENT COLLECTOR HAVING AN INCREASED RESISTANCE TO CORROSION

(71) Applicant: UNIVERSITE DE NANTES, Nantes (FR)

(72) Inventors: Thierry Brousse, La Chapelle sur Erdre (FR); Cedric Martin, Suce-sur-Erdre (FR); Anne-Lise Brisse, Nantes (FR)

(73) Assignee: UNIVERSITE DE NANTES, Nantes (FR)

( * ) Notice: Subject to any disclaimer, the term of this patent is extended or adjusted under 35 U.S.C. 154(b) by 71 days.

(21) Appl. No.: 15/762,693

(22) PCT Filed: Sep. 19, 2016

(86) PCT No.: PCT/EP2016/072180
§ 371 (c)(1),
(2) Date: Mar. 23, 2018

(87) PCT Pub. No.: WO2017/055126
PCT Pub. Date: Apr. 6, 2017

(65) Prior Publication Data
US 2018/0266003 A1   Sep. 20, 2018

(30) Foreign Application Priority Data
Sep. 29, 2015   (EP) ..................... 15306527

(51) Int. Cl.
*C25D 9/02*   (2006.01)
*C25D 7/00*   (2006.01)
(Continued)

(52) U.S. Cl.
CPC ............ *C25D 9/02* (2013.01); *C25D 5/44* (2013.01); *C25D 7/00* (2013.01); *H01G 11/28* (2013.01);
(Continued)

(58) Field of Classification Search
None
See application file for complete search history.

(56) References Cited

U.S. PATENT DOCUMENTS

| | | | |
|---|---|---|---|
| 5,124,022 A | 6/1992 | Evans, II et al. | |
| 5,591,318 A * | 1/1997 | Li | H01G 9/025 205/205 |

(Continued)

FOREIGN PATENT DOCUMENTS

| | | |
|---|---|---|
| CN | 102593415 | 7/2012 |
| EP | 2431165 | 3/2012 |
| JP | 2002115098 | 4/2002 |

OTHER PUBLICATIONS

European Search Report dated Mar. 8, 2016.
International Search Report dated Mar. 9, 2017.

*Primary Examiner* — Scott J. Chmielecki
(74) *Attorney, Agent, or Firm* — Ipsilon USA, LLP

(57) ABSTRACT

Electrochemical device or photo-electrochemical device comprising an electrolyte containing a bistriflimide anion, hereafter named as TFSI—, at least two electrodes, each of these electrodes being in contact with a current collector comprising a metal support characterized in that at least one electrode has a current collector the metal support of which comprises an electro-active surface which is functionalized with linear or branched fluorinated carbon chains, such as perfluoroalkyl chains, in the form of a molecular layer which improves the corrosion resistance of said functionalized surface compared to a non-functionalized surface, wherein not impairing the passage of electrons between said electrode and its current collector, the functionalized surface being at the interface between said electrode and its current collector.

16 Claims, 6 Drawing Sheets

(51) Int. Cl.

| | | |
|---|---|---|
| C25D 5/44 | (2006.01) | |
| H01G 11/06 | (2013.01) | |
| H01G 2/12 | (2006.01) | |
| H01M 4/13 | (2010.01) | |
| H01M 10/04 | (2006.01) | |
| H01M 4/66 | (2006.01) | |
| H01M 10/052 | (2010.01) | |
| H01M 10/0565 | (2010.01) | |
| H01M 10/0568 | (2010.01) | |
| H01M 10/54 | (2006.01) | |
| H01M 14/00 | (2006.01) | |
| H01G 11/28 | (2013.01) | |
| H01G 11/32 | (2013.01) | |
| H01G 11/50 | (2013.01) | |
| H01G 11/56 | (2013.01) | |
| H01G 11/62 | (2013.01) | |
| H01G 11/68 | (2013.01) | |
| H01G 11/86 | (2013.01) | |
| H01M 4/131 | (2010.01) | |
| H01M 10/0525 | (2010.01) | |
| H01G 11/60 | (2013.01) | |
| H01G 11/84 | (2013.01) | |
| H01M 4/133 | (2010.01) | |
| H01M 4/505 | (2010.01) | |
| H01M 4/525 | (2010.01) | |
| H01M 4/587 | (2010.01) | |

(52) U.S. Cl.
CPC ............ *H01G 11/32* (2013.01); *H01G 11/50* (2013.01); *H01G 11/56* (2013.01); *H01G 11/60* (2013.01); *H01G 11/62* (2013.01); *H01G 11/68* (2013.01); *H01G 11/84* (2013.01); *H01G 11/86* (2013.01); *H01M 4/131* (2013.01); *H01M 4/661* (2013.01); *H01M 4/663* (2013.01); *H01M 4/667* (2013.01); *H01M 10/0427* (2013.01); *H01M 10/052* (2013.01); *H01M 10/0525* (2013.01); *H01M 10/0565* (2013.01); *H01M 10/0568* (2013.01); *H01M 10/54* (2013.01); *H01M 14/005* (2013.01); *H01G 2/12* (2013.01); *H01G 11/06* (2013.01); *H01M 4/133* (2013.01); *H01M 4/505* (2013.01); *H01M 4/525* (2013.01); *H01M 4/587* (2013.01); *H01M 2300/0037* (2013.01); *Y02E 60/13* (2013.01); *Y02W 30/84* (2015.05)

(56) References Cited

U.S. PATENT DOCUMENTS

| | | | |
|---|---|---|---|
| 5,652,072 A | 7/1997 | Lamanna et al. | |
| 6,011,135 A | 1/2000 | Mori | |
| 6,063,522 A * | 5/2000 | Hamrock | H01M 6/183 429/200 |
| 7,699,916 B1 * | 4/2010 | Carter | C09D 5/084 106/14.05 |
| 2008/0038643 A1 * | 2/2008 | Krehl | H01M 4/133 429/322 |
| 2008/0280208 A1 * | 11/2008 | Naoi | H01M 10/0431 429/247 |
| 2012/0041507 A1 * | 2/2012 | Wang | H01M 2/027 607/36 |
| 2014/0234709 A1 * | 8/2014 | Bernard | H01M 4/06 429/217 |
| 2016/0118690 A1 | 4/2016 | Bomkamp et al. | |

* cited by examiner

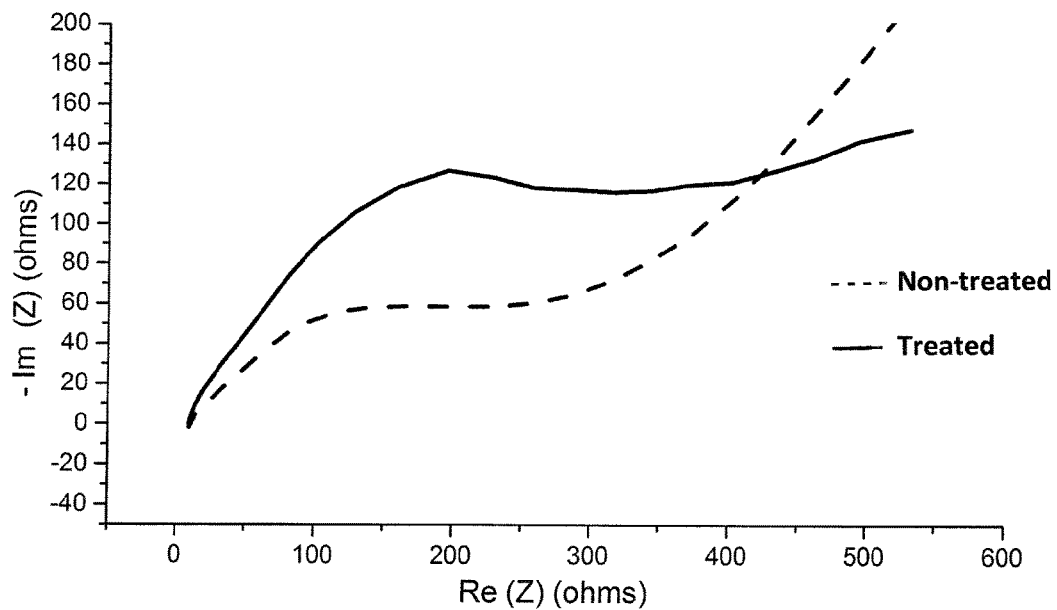
Fig. 1
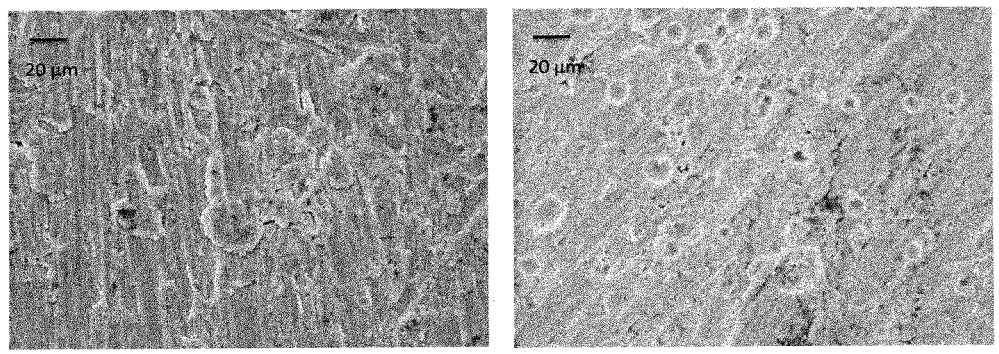
Fig. 5B Fig. 5A

ELECTROCHEMICAL DEVICES WITH CURRENT COLLECTOR HAVING AN INCREASED RESISTANCE TO CORROSION

RELATED APPLICATION

This application is a National Phase of PCT/FR2016/072180, filed on Sep. 19, 2016, which in turn claims the benefit of priority from European Patent application No. 15 306 527.1, filed on Sep. 29, 2015 the entirety of which are incorporated by reference.

FIELD OF THE INVENTION

The present invention relates to the field of energy storage devices, lithium-ion, sodium-ion, magnesium-ion, calcium-ion or aluminum ion batteries, electrochemical capacitors so called supercapacitors, lithium-ion or sodium-ion capacitors, hybrid devices which are intermediate between batteries and supercapacitors, photo-batteries, or electro-chromic devices.

It applies more particularly to the field of the current collectors which are included in such batteries or devices.

BACKGROUND OF THE INVENTION

In such devices or batteries the current collector generally comprises a sheet of metal, mostly based on Aluminum, to provide electrical connection to the electrolyte.

A current collector is a metallic support, the function of which is to provide to or harvest electrons from an electrode inside an electrochemical device or a photo-electrochemical device.

In devices or batteries, especially rechargeable lithium batteries, where the solid or liquid electrolyte includes a highly conductive salt such as the trifluorosulfonimide anion (TFSI$^-$), corrosion is often observed after several cycling or at high potentials. This is mainly a localized corrosion named pitting corrosion, which induces small holes in the metal of the current collector, modifying its properties and impairing its efficiency, and consequently impairing the efficiency of the battery or device.

In order to attenuate, or at least limit, the pitting corrosion several approaches have been proposed yet.

A first approach is to modify the electrolyte composition in contact with the current collector. Numerous attempts have been made, among others:

Increasing the concentration of LiTFSI in the electrolyte of lithium-ion batteries (Kazuaki Inoue et al., "*Suppression of aluminum corrosion by using high concentration of LiTFSI*" in Journal of Power Sources, vol. 231, pp. 234-238, 2013);

Incorporating nanoparticles in the LiTFSI electrolyte, for instance silica fume nanoparticles (Yangxing Li et al. "*Attenuation of aluminum current collector corrosion in LiTFSI electrolytes using fumed silica nanoparticles*" in Electrochemical and Solid-State Letters, vol. 7, pp. A228-A230, 2004);

Adding a small amount of LiPF$_6$ in an electrolyte containing mainly LiTFSI as lithium salt (Mouad Dahbi et al. "*Comparative study of EC/DMC LiTFSI and LiPF6 electrolytes for electrochemical storage*" in Journal of Power Sources, vol. 196, pp. 9743-9750, 2011);

Using ionic liquid instead of the classical organic carbonates solvents (Ethylene carbonate EC, diethylcarbonate DEC, dimethylcarbonate DMC) in the electrolyte (C. Peng et al. "*Anodic behavior of Al current collector in 1-alkyl-3-methylimidazolium bis [(trifluoromethyl) sulfonyl] amide ionic liquid electrolytes*" in Journal of Power Sources, no. 173, pp. 510-517, 2007).

The technical solutions brought by this first approach modify the environment of the current collector. Such modifications or incorporation of additives lead to increased costs of the electrolyte.

Another approach is to replace the aluminum current collector by a new material, for instance a flexible film made of pyrolytic polyimide graphite as disclosed by P. Han et al. "*Anticorrosive flexible pyrolytic polyimide graphite film as a cathode current collector in lithium bis(trifluoromethane sulfonyl)*" in Electrochemistry Communications, pp. 70-73, 2014. This material is more expensive than aluminum sheet and less easy to process. Its use severely limits the number of possible applications.

Still another approach is to coat the aluminum current collector surface with a protective layer as disclosed in WO 2005/089390 and in US 2012/0121974 which describe a lithium-ion electrochemical cell, where the cathode current collector comprising aluminum or aluminum alloy has a protective, electronically conductive coating on its surface, made of substantially pure carbon or graphite or mixed with a polymer for good mechanical properties of the coating and good adhesion of the coating to the surface of the metal foil, this last embodiment being preferred in the art. In this case (carbon+polymer), the thickness of the coating is from 0.1 µm to 10 µm. However, example 1 of US 2012/0121974 demonstrates that the protective, conductive carbon coating by itself is not sufficient to prevent corrosion of aluminum current collector, and consequently disclose in further examples the addition of LiBOB or LiPF$_6$ to the electrolyte solution to inhibit corrosion.

Therefore the main objective of the present invention is to provide an electrochemical device or a photo-electrochemical device having a current collector with improved anti-corrosion properties, preferably without modifying the electrolyte in contact with such current collector.

Another objective of the invention is to provide an electrochemical device or a photo-electrochemical device having a current collector for electrochemical cells with improved corrosion resistance, in particular to pitting corrosion, and therefore extending the life of the device.

Another objective of the invention is to provide an electrochemical device or a photo-electrochemical device having a current collector which will be corrosion resistant and heat resistant, of low cost and easily processable.

BRIEF SUMMARY OF THE INVENTION

The above drawbacks of the prior art current collectors in electrochemical devices comprising an electrolyte containing a TFSI ion electrochemical device or photo-electrochemical device are overcome by the device of the present invention.

According to the invention, the electrochemical device or photo-electrochemical device comprising an electrolyte containing a bistriflimide anion, hereafter named as TFSI$^-$, at least two electrodes, each of these electrodes being in contact with a current collector comprising a metal support is characterized in that at least one electrode has a current collector the metal support of which comprises an electro-active surface which is functionalized with linear or branched fluorinated carbon chains, such as perfluoroalkyl chains, in the form of a molecular layer which improves the corrosion resistance of said functionalized surface compared to a non-functionalized surface, wherein not impairing the passage of electrons between said electrode and its current collector, the functionalized surface being at the interface between said electrode and its current collector, that is in direct contact with the metal support.

The bistriflimide anion which is systematically known as bis(trifluoromethane)sulfonimide anion and colloquially known as TFSI⁻, is), a non-coordinating anion with the chemical formula $[(CF_3SO_2)_2N]^-$ and developed formula:

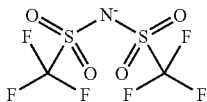

In a preferred embodiment, the fluorinated carbon chains of the functionalized electro-active surface comprise perfluoroalkyl aryl moieties.

In particular, the perfluoroalkyl aryl moiety is preferably an aromatic cycle which is mono- or di-substituted by respectively one or two linear or branched perfluoroalkyl chain(s), preferably linear or branched perfluoro $C_1$ to $C_{20}$ alkyl chain(s), more preferably linear or branched perfluoro $C_1$ to $C_{10}$ alkyl chain(s).

For instance, the linear or branched fluorinated carbon chain may be a perfluoroalkyl chain chosen among the following groups: trifluoromethyl, perfluorohexyl and perfluorooctyl group.

The metal support of the current collector may be an aluminum alloy or an aluminum substrate having a purity above 95%, preferably a purity equal or above 99%, or an aluminum alloy comprising more than 95% Al, preferably more than 99% Al.

In a first embodiment of the invention, the TFSI⁻ containing electrolyte is a liquid electrolyte, preferably an organic or ionic liquid electrolyte.

For instance, the TFSI⁻ electrolyte may be a mixture of a salt containing said TFSI⁻ anion (such as LiTFSI, NaTFSI and/or NH₄TFSI), and an organic solvent or mixture of organic solvents (such as propylene carbonate, dimethyl carbonate, ethyl carbonate, x-butyrolactone), optionally containing additives (such as vinylene carbonate).

The TFSI⁻ electrolyte may also be a mixture of a salt containing said TFSI⁻ anion (such as LiTFSI, NaTFSI and/or NH4TFSI) dissolved in pure or diluted molten salts, systematically know as ionic liquids (such salts may be chosen among 1-Ethyl-3-methylimidazolium bis-(trifluoromethylsulfonyl)-imide, N-Propyl-N-methylpyrrolidinium bis(trifluoromethanesulfonyl)imide, 1-Butyl-1-methylpyrrolidinium bis(trifluoromethanesulfonyl)imide).

The above list is not limitative and other solvents or ionic liquids that can dissolved TFSI⁻ based salts may be employed.

In a second embodiment of the invention, the TFSI— containing electrolyte is a solid electrolyte, preferably a polymer based electrolyte, or a physical ionogel, or a chemical ionogel.

As example of said solid electrolyte is preferably a mixture of a TFSI⁻ anion containing salt, such as LiTFSI, NaTFSI, or NH4TFSI, and a polymer or mixture of polymer, such as poly(ethylene) oxide, and/or polyvinylidene fluoride.

As example of ionogel is preferably a mixture of a TFSI⁻ containing ionic liquid or an ionic liquid and a TFSI⁻ containing salt, such as LiTFSI, NaTFSI, or NH4TFSI, and a silica matrix or a mixture of silica and a polymer matrix.

Of course the above list is not limitative and any polymer exhibiting solvating properties or any ionogel in which TFSI⁻ based salt can be added may be employed.

As will be seen in the examples below, the molecular functionalized current collector of the electrochemical devices of the present invention provides improved anti-corrosion properties, without requiring the use of an anti-corrosion additive in the electrolyte. This leads to improved life of the devices using said current collector.

Moreover this kind of current collector is a low cost current collector, which is easily processable, non toxic and heat resistant (up to 400° C.).

The electrochemical device or photo-electrochemical device of the present invention is chosen among: an energy storage device, a lithium-ion, a sodium-ion, a magnesium-ion, a calcium-ion or an aluminum ion battery (including metal-air batteries using one of the corresponding metal), an electrochemical capacitor so called supercapacitor, a lithium-ion or a sodium-ion capacitor, a hybrid device which is intermediate between battery and supercapacitor, a photo-battery, or an electro-chromic device.

As an example, the electrochemical device of the invention is a lithium-ion battery, comprising
 a graphite anode with a copper current collector,
 a Nickel Manganese Cobalt cathode with a functionalized aluminum current collector, and
 LiTFSI 0.75M in Ethylene carbonate:Diethylcarbonate as electrolyte.

The present invention also relates to a process for preparing the above functionalized current collector, comprising the following main steps:
 Providing a current collector for electrochemical devices, said current collector comprising a support with a metallic surface;
 Polishing said metallic surface with a fine abrasive to remove any oxide layer, then washing said surface with an organic solvent under ultra-sonication to obtain a polished electro-active surface;
 Functionalizing the polished electro-active surface by dipping said surface of the current collector in a solution comprising a diazonium salt of a perfluoroalkyl moiety, preferably a perfluoroalkyl aryl moiety, under reducing conditions of the diazonium salt, and obtaining an electro-active surface functionalized with the perfluoroalkyl aryl moiety,
 Optionally washing the functionalized surface with an organic solvent under ultra-sonication, to remove the non-functionalized molecules from the electro-active surface of the support.

Preferably in the process according to the invention, the functionalized step is performed in an electrochemical cell, a photochemical cell, a heated cell or a sonicated cell and/or with the help of a chemical reducer in said solution.

The polishing step is preferably a dry polishing step. For instance, as will be shown in comparative example 3 below, better results are obtained with a dry polishing step when the metal support comprises aluminum.

The functionalizing step may be performed in a chrono-amperometric cell containing a solution comprising a diazonium salt of the functionalizing perfluoroalkyl aryl moiety, an auxiliary electrode, a reference electrode and said metallic support as working electrode, at a potential under the redox potential of said diazonium salt of the functionalizing perfluoroalkyl aryl moiety.

Preferably, the auxiliary electrode is an electronically conductive plate, such as platinum, and the working electrode is said metallic support made of an aluminum substrate having a purity above 95%, preferably a purity equal or above 99%, or made of an aluminum alloy comprising more than 95% Al, preferably more than 99% Al.

The reference electrode may be Ag/Ag Cl, wherein the preferred potential for the chronoamperometric functionalizing step is then of −0.9 V vs. Ag/AgCl.

These and other embodiments of the present invention will be more apparent when read with the following description of the examples in relationship with the attached following drawings:

BRIEF DESCRIPTION OF THE DRAWINGS

FIG. 1 presents Nyquist diagrams, before cycling, of a unfunctionalized (non-treated) aluminum current collector and of a functionalized (treated) aluminum current collector according to the present invention;

FIG. 5A and FIG. 5B are scanning electron microscopy (SEM) pictures of respectively unfunctionalized (non-treated) aluminum substrate, and functionalized (treated) aluminum substrate according to the invention;

DETAILED DESCRIPTION OF THE INVENTION

Example 1

Figure 2:
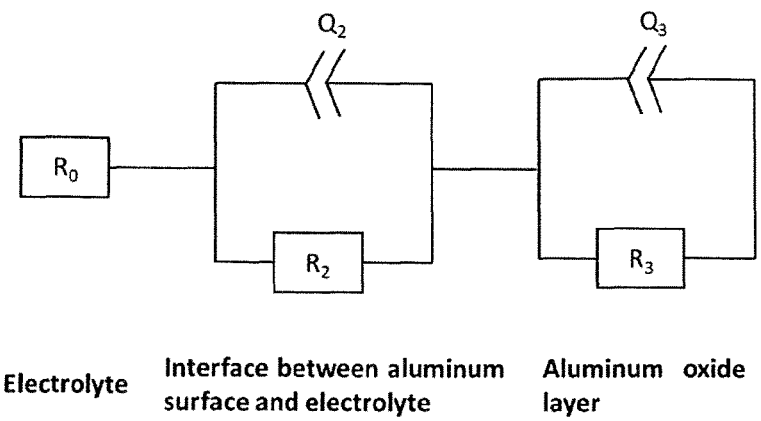
FIG. 2 is a schematic diagram equivalent electric circuit for interfaces of a unfunctionalized current collector.

I/ Functionalization Procedure of a Current Collector
I-a) Chemicals

All standard chemicals were purchased from Sigma Aldrich. In the examples the aniline precursor for preparing the diazonium salt was 4-(heptadecafluorooctyl) aniline, the reducing agent tert-butylnitrite and the electrolyte was tetraethylammonium tetrafluoroborate dissolved in acetonitrile. All those reactants were used as received.

I-b) Preparation of Aluminum Substrates

A sheet (foil of 125 μm thickness) of non-allied aluminum was chosen with a purity of 99%. Before doing any functionalizing on this current collector the surface was dry polished using a finer abrasive (preferably grade 500) to remove the aluminum oxide layer, and then washed in a bath with acetone and ethanol using ultra-sonication.

I-c) Functionalization

Typical functionalizing experiments were carried out in open air at room temperature (20-25° C.) and atmospheric pressure.

A first electrolyte solution of 0.1M tetraethylammonium tetrafluoroborate in acetonitrile was prepared. Then a second solution of diazonium salts (10 mM) was prepared by adding 4-(heptadecafluorooctyl) aniline and 3 equivalents of tert-butylnitrite to the first solution. This "diazonium solution" was kept under stirring for 30 minutes around.

Electrochemical functionalizing experiments were carried out in a three-electrode cell containing the "diazonium solution" and comprising a working electrode at which the functionalizing reaction takes place (aluminum sheet), an auxiliary electrode (platinum plate) and a reference electrode (Ag/AgCl). Chronoamperometry (CA) permitted to reduce the diazonium cations on the aluminum substrate to form a functionalized surface. The working electrode was polarized at −0.9V vs. Ag/AgCl for different periods of time (preferably at least 1 minute) according to the desired degree of functionalizing. At the end of the functionalizing process, the modified current collector was washed by dipping in acetone under ultrasonication to remove the unfunctionalized molecules from the aluminum surface.

II/ Characterisation of the Functionalized Surface
II-a) Surface Modification

In order to measure the surface tension and also to observe the shape of a water drop on the substrate, the contact angles of each sample were measured 5 times using the sessile-drop method by dispensing 1 mL droplets on the sample surfaces. All of the contact angle measurements were taken under ambient laboratory conditions with a temperature of ~20° C. and a relative humidity of ~45%.

In addition, the surface was watched with a scanning electron microscope and analyzed by X-ray dispersive spectroscopy. Results are presented in Table 1 below:

TABLE 1

| Substrate | Functionalizing by CA | Water Contact Angle | Surface energy (mN m$^{-1}$) | | | X-ray micro analysis (% mass fluorine) |
|---|---|---|---|---|---|---|
| | | | Total | Polar component | Dispersive component | |
| Aluminum 99% - foil 125 μm | no | 63 | 43 | 12 | 31 | 0.05 ± 0.06 |
| | yes | 92 | 20 | 5 | 15 | 0.30 ± 0.06 |

CA = chrono amperometry
% mass fluorine given for a 100 × 100 × 1 μm$^3$

A drastic increase of the % mass fluorine is observed and is assigned to the presence of perfluoroalkyl groups on the functionalized surface.

The contact angle of the water drop is higher for modified aluminum and the value of the polar component of surface energy decreases when the substrate is functionalized. All these results enable to conclude on the modification of aluminum surface samples by functionalizing a hydrophobic molecular layer.

II-b) Impedance Spectroscopy

Figure 3:
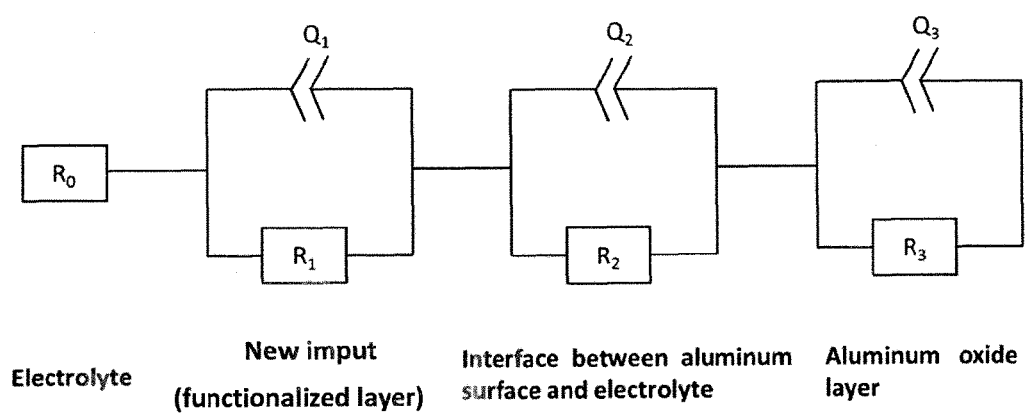
FIG. 3 is a schematic diagram equivalent electric circuit for interfaces of the functionalized current collector.

The impedance spectroscopy (see Nyquist's diagram on FIG. 1) permits mainly to determine that the current collector surface has been modified by the functionalizing procedure. After establishment of a model (see FIGS. 2 and 3 and respective calculated values presented in tables 2 and 3) it is possible to notice a new input due to the functionalized layer.

TABLE 2

| Index i | $R_i$ (Ω) | $Q_i$ (F · s$^{-1/ai}$) | $a_i$ |
|---|---|---|---|
| 0 | 6 | — | — |
| 1 | — | — | — |
| 2 | 309 | 33 10$^{-6}$ | 0.73 |
| 3 | 459 | 0.7 10$^{-3}$ | 0.66 |

TABLE 3

| Index i | $R_i$ (Ω) | $Q_i$ (F · s$^{-1/ai}$) | $a_i$ |
|---|---|---|---|
| 0 | 6 | — | — |
| 1 | 14 | 2 10$^{-6}$ | 0.1 |
| 2 | 423 | 29 10$^{-6}$ | 0.75 |
| 3 | 264 | 0.9 10$^{-3}$ | 0.68 |

This new input has a low resistance (14Ω) and a constant phase element (CPE) of $2.10^{-6}$ F s$^{-1/a}$. The calculated values indicate that this new input (due to the functionalized molecular layer) is weak and has little influence on the electron transfer. Therefore, it would not alter the basic requirements for a current collector.

III/ Effect of Functionalizing

III-a) Linear Sweep Voltammetry

Electrochemical cell (SwageLock cell):

Reference and counter electrode=lithium metal;

Working electrode=aluminum (functionalized or non-functionalized surface);

Electrolyte=LiTFSI 0.75M in EC:DEC (3:7).

(EC=Ethylene carbonate/DEC=Diethylcarbonate)

Parameters:

Speed rate=1 mV s−1;

Electrode surface=1.13 cm$^2$;

$E_{min}$=Eoc (open-circuit voltage);

$E_{max}$=5 V vs. Li/Li+.

Figure 4:
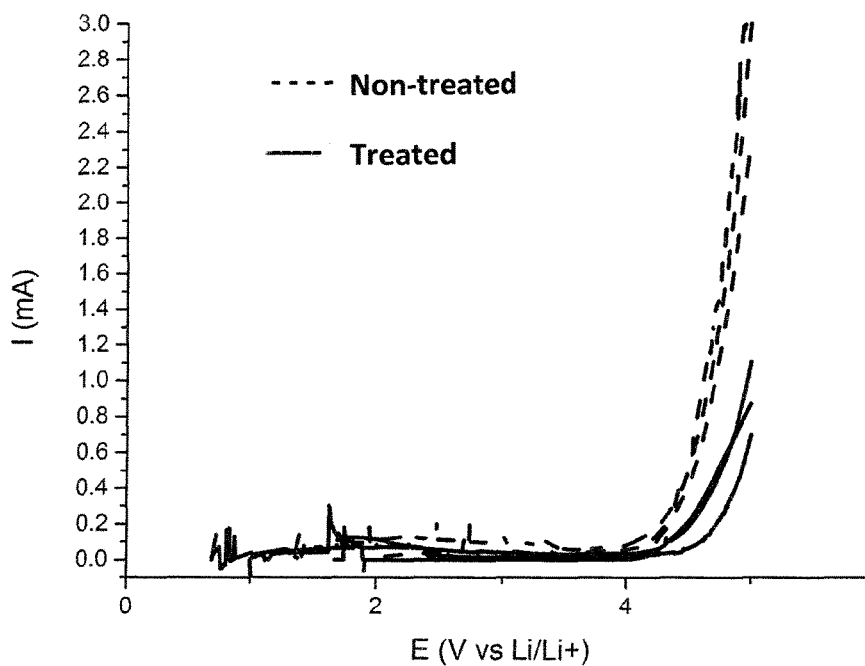
FIG. 4 are linear sweep voltammetry curves of the functionalized and unfunctionalized aluminum substrates.
Figure 8:
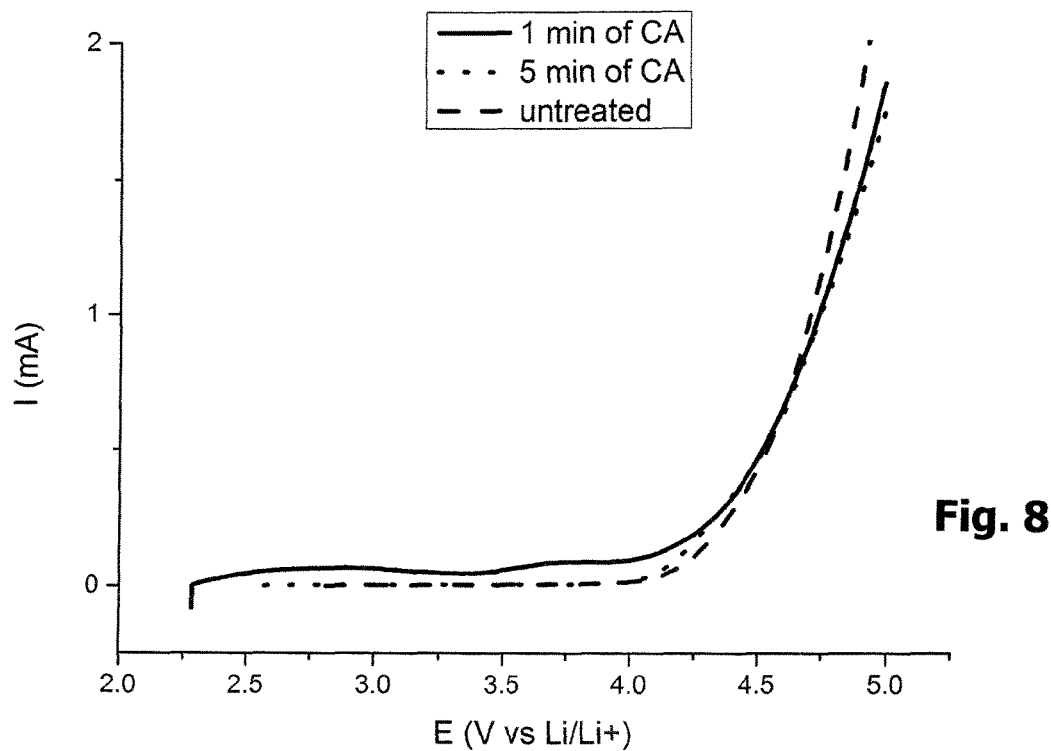
FIG. 8 are linear sweep voltammetry curves of unfunctionalized and functionalized aluminum substrates of the comparative example 2.

In this voltammetric method the current at a working electrode is measured while the potential between the working electrode and a reference electrode is swept linearly with time, from $E_{min}$ to $E_{max}$ at a determined speed rate. The selected area analyzed by this method is 1.2 cm$^2$ for all the samples. There are two phenomena to observe on FIG. 4.

First of all the maximum current measured at 5V vs. Li/Li$^+$ is totally different when the aluminum is functionalized or not. An impressive decrease of the maximum current of 80% is observed when the aluminum current collector is functionalized by the functionalized molecules. Since the current is proportional to the corrosion rate this clearly indicates that the functionalizing treatment according to the present invention reduces aluminum pitting by a factor of at least 3.

The second interesting parameter is the potential value at which the current begins to raise, which corresponds to the potential at which the corrosion phenomenon begins. It is shown on the graph that the curve corresponding to the functionalized current collector begins to raise after the non-coated one.

So the functionalized surface according to the present invention increases the corrosion potential of the current collector from 3.9 V vs. Li/Li$^+$ up to 4.2V vs. Li/Li$^+$. This means that the functionalized current collector can be used at a higher potential than the unfunctionalized one, thus enabling to reach higher cell voltage when this functionalized current collector will be integrated in a real device. For an energy storage device, this would imply working with higher energy density in the device using the functionalized current collectors.

III-b) Scanning Electron Microscopy

SEM images were taken with secondary electron imaging mode and are presented in FIGS. 5A and 5B.

The corrosion of aluminum generally appears in the form of localized corrosions called pitting, i.e.: small holes created in the metal surface. Holes (5 to 20 μm diameter) seen on the right picture (FIG. 5A) are evidencing that the untreated current collector is quickly degraded by corrosion. The picture on the left (FIG. 5B) shows the efficiency of the functionalized aluminum substrate according to the present invention with virtually no holes (no corrosion) thus confirming the electrochemical results presented above.

III-c) Galvanostatic Cycling

Electrochemical Cell:

Reference and counter electrode=lithium metal;

Working electrode=NMC (Nickel Manganese Cobalt) cathode (LiNi$_1$/3Mn$_1$/3Co$_1$/3O$_2$) casted on unfunctionalized or functionalized aluminum; this material is a standard material classically used as positive electrode in Li-ion batteries;

Electrolyte=LiTFSI 0.75M in EC:DEC (3:7).

(EC=Ethylene carbonate/DEC=Diethylcarbonate)

Parameters:

Average mass of active material=5 mg cm$^2$;

Average current=±136 pA;

$E_{min}$=2.7 V VS. Li/Li$^+$;

$E_{max}$=4.2 V VS. Li/Li$^+$;

C/10.

Figure 6:
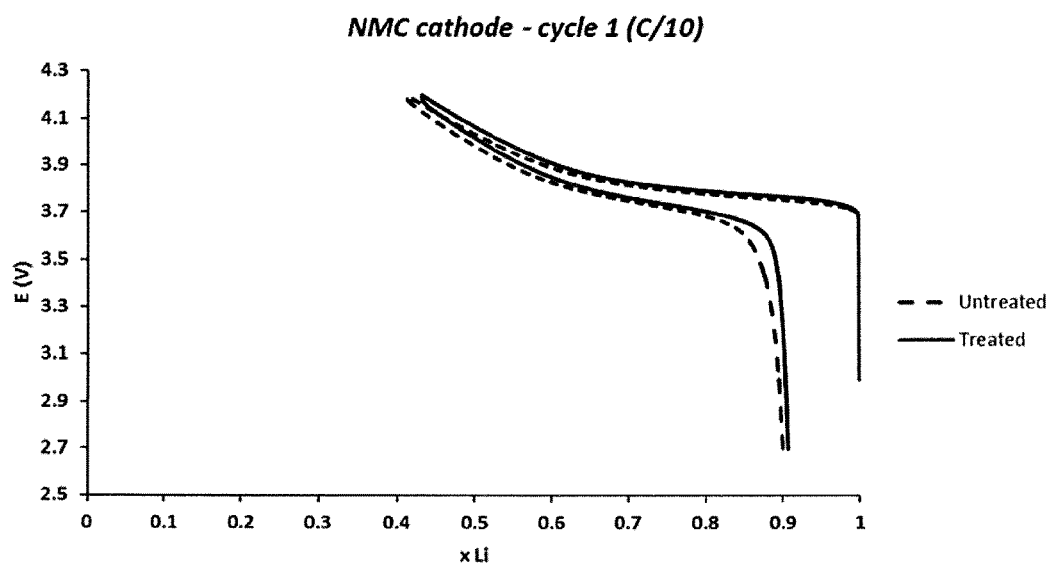
FIG. 6 shows curves of galvanostatic cycling at cycle 1 (C/10) of functionalized and unfunctionalized current collectors.
Figure 7:
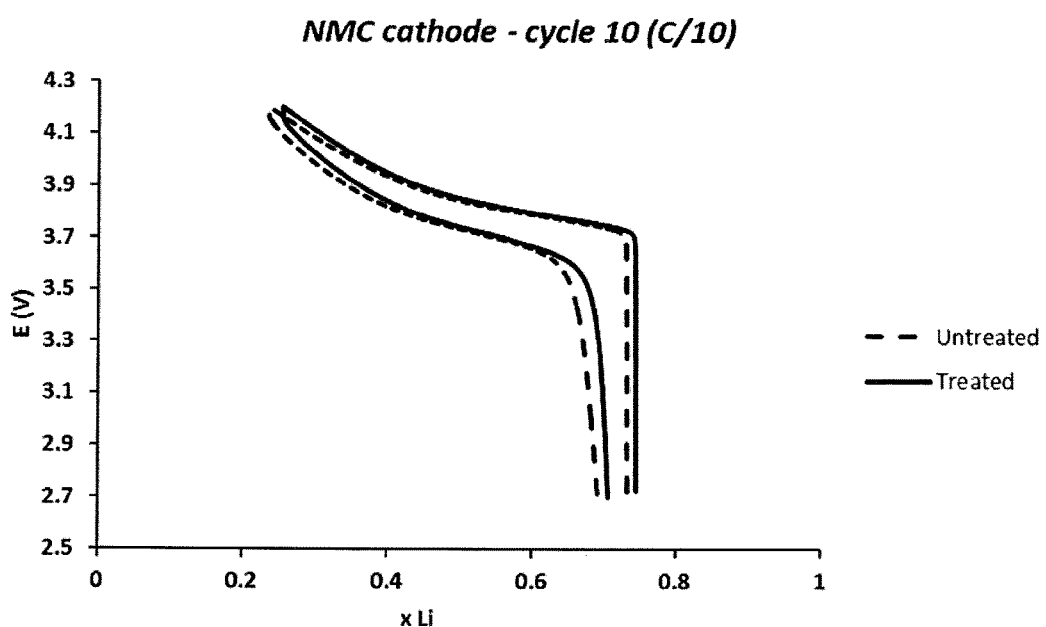
FIG. 7 shows curves of galvanostatic cycling at cycle 10 (C/10) of functionalized and unfunctionalized current collectors.

The galvanostating cycling curves are presented on FIGS. 6 and 7 respectively corresponding to cycle 1 (C/10) and cycle 10 (C/10).

It can be noticed that the NMC electrode operates in the same manner whether the current collector surface is functionalized or not, which means that, as expected, the functionalizing treatment according to the present invention does not change the electrochemical behavior of the NMC cathode material.

The polarization is also an interesting phenomenon to look at. Indeed the potential width observed between the charge and the discharge is the same for all the batteries tested. The NMC cathode operates as usual when deposed on a treated current collector. Thus the functionalizing treatment prevents corrosion of the aluminum current collector without inhibiting the electrochemical performance of the NMC electrode.

Example 2 (Comparative)

IV/ Functionalizing Procedure of a Non-Fluorinated Molecule

IV-a) Preparation of Aluminum Substrates

A sheet (foil of 125 µm thickness) of non allied aluminum was chosen with a purity of 99%. Before doing any functionalizing on this current collector the surface was dry polished using a finer abrasive (500 grade) and then washed with acetone and ethanol under ultrasonication.

IV-b) Functionalizing

Typical functionalizing experiments were carried out in open air at room temperature (20-25° C.) and atmospheric pressure.

A first solution of an electrolyte of 0.1M tetraethylammonium tetrafluoroborate in acetonitrile was prepared. Then a second solution of diazonium salts (10 mM) was prepared by adding 4-dodecyl aniline and 3 equivalents of tert-butyl nitrite to the first solution. This "diazonium solution" was kept under stirring for 30 minutes.

Electrochemical functionalizing experiments were carried out in a three-electrode cell containing the "diazonium solution" comprising a working electrode at which the functionalizing reaction takes place (aluminum sheet), an auxiliary electrode (platinum plate) and a reference electrode (Ag/AgCl). Chronoamperometry (CA) permitted to reduce the diazonium cations on the aluminum substrate to form a film functionalized surface. The working electrode was polarized at −1.2V vs. Ag/AgCl for different periods of time according to the desired degree of functionalizing. At the end of the functionalizing process, the modified current collector was dipped in acetone under ultrasonication.

IV-c) Characterisation of Functionalized Surface

In order to measure the surface tension and also to observe the shape of a water drop on the substrate, the contact angles of each sample were measured 5 times using the sessile-drop method by dispensing 1 mL droplets on the sample surfaces. All of the contact angle measurements were taken under ambient laboratory conditions with a temperature of ~20° C. and a relative humidity of ~45%.

Results are presented in Table 4 below:

TABLE 4

| Substrate | Functionalizing step by CA | Functionalizing time (min) | Water Contact angle | Surface energies (mN m$^{-1}$) | | |
|---|---|---|---|---|---|---|
| | | | | Total | Polar component | Dispersive component |
| Aluminum 99% - foil 125 µm | no | — | 63 | 43 | 12 | 31 |
| | yes | 5 | 88 | 28 | 4 | 24 |
| | | 1 | 93 | 34 | 1 | 32 |

CA = chronoamperometry

The contact angle of the water drop is higher for functionalized aluminum and the value of the polar component of surface energy decrease when the substrate is functionalized.

All these results permit to conclude on the modification of aluminum surface samples by functionalizing a hydrophobic molecule layer.

IV-d) Effect of Coating

Electrochemical Cell:

Reference and counter electrode=lithium metal;

Working electrode=aluminum (functionalized or non-functionalized);

Electrolyte=LiTFSI 0.75M in EC:DEC (3:7).

Parameters:

Speed rate=1 mV s$^{-1}$;

Electrode surface=1.13 cm$^2$;

$E_{min}=E_{oc}$ (open-circuit voltage);

$E_{max}$=5 V vs. Li/Li$^+$.

In this voltammetric method the current at a working electrode is measured while the potential between the working electrode and a reference electrode is swept linearly from $E_{min}$ to $E_{max}$ at a fixed speed rate. The curves are really similar: there is no reduction of the corrosion current at 5V vs. Li/Li$^+$ and no rise decrease in the corrosion potential. The non-fluorinated molecule functionalized on the aluminum surface does not prevent the corrosion of the current collector.

Example 3 (Comparative)

The influence of the polishing step has been tested. The support is an Aluminum Goodfellow sheet with a purity of 99%.

The surface of aluminum has been polished with an abrasive paper 800.

The functionalizing treatment has then been performed by chronoamperometry according to the conditions described in example 1 (step I-c).

Comparative tests have been made, before and after functionalization, with the aluminum sheet without polishing, after polishing under water lubrification or with dry polishing. The results are presented in table 5 below:

TABLE 5

| Polishing step | Contact angle (°) of a water drop BEFORE FUNCTIONN-ALIZATION | Contact angle (°) of a water drop AFTER FUNCTIONN-ALIZATION |
|---|---|---|
| Without polishing | 31 ± 2 | 36 ± 2 |
| Water polishing | 33 ± 2 | 48 ± 2 |
| Dry polishing | 35 ± 2 | 100 ± 2 |

It appears that the polishing step is an important step in the to functionalization treatment of the present invention, in particular for aluminum substrates. In fact the aluminum support surface needs to be polished without lubricant, more specifically without water. The polishing step aims to remove all or part of oxide layer and obtain an electro-active surface. If water is used during this step the oxide layer seems to be reformed instantly. Therefore dry polishing is much preferred.

Example 4

Figure 9:
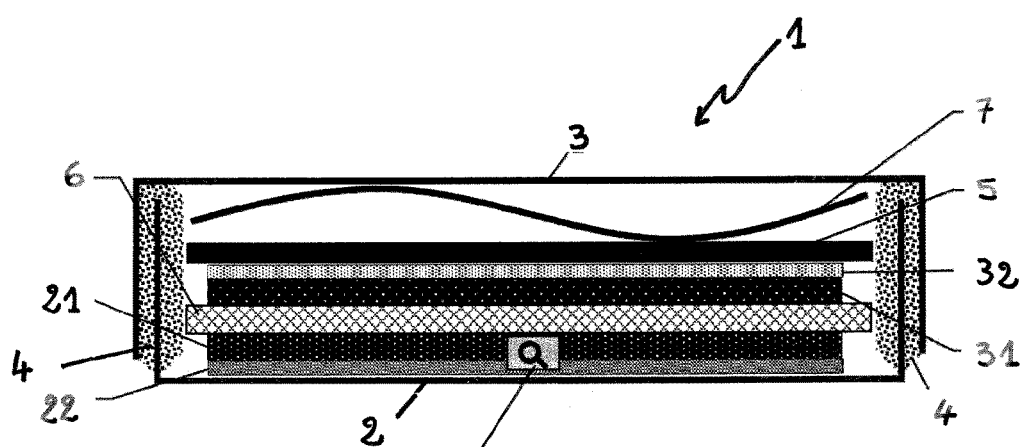
FIG. 9 is a schematic cross section of a lithium ion battery in the shape of a button cell.

A full electrochemical device like a lithium ion battery could be in the shape of a button cell as shown in FIG. 9. Assembly of such button cell battery is described hereafter.

The button cell case 1 comprises a cathode shell 2 and an anode shell 3, both made of stainless steel, separated by an insulating gasket 4.

Assembly of the respective parts of the button cell comprises the superposition of the following components from bottom (cathode shell) to top (anode shell) as shown on FIG. 9:

- on top of the cathode shell is placed the current collector with its functionalized surface turned upwards, in contact with the cathode 21 material
- on to the cathode 21 is deposited a porous separator 6 either soaked with the liquid electrolyte comprising LITFSI or made of a solid electrolyte containing LITFSI
- on top of the separator 6 is laid the anode 31 material (usually graphite) casted in the anode current collector 32, usually in copper
- then is placed a stainless steel spacer 5 and a spring 7 is interposed between the spacer 5 and the anode shell 3 to ensure a sufficient pressure between all the components of the button cell
- after having positioned the anode shell 3 on top of all the components, the button cell is sealed using an automatic press.

Figure 9A:
FIG. 9A is a SEM cross section image of the interface between cathode and functionalized current collector.

The SEM image of the enlarged cross section of FIG. 9A shows the cathode current collector 22 with its functionalized surface 23 (too thin to be clearly observed) on top of which is laid the cathode electrode 21.

More precisely, as a specific example of the cell of FIG. 9, the electrochemical cell is made of:
- a graphite anode casted onto a copper current collector;
- a NMC (Nickel Manganese Cobalt) cathode (LiNi1/3Mn1/3Co1/3O2) casted on unfunctionalized aluminum (for comparative tests) or functionalized aluminum; this cathode material is a standard material classically used as positive electrode in Li-ion batteries;
- the electrolyte is LiTFSI 0.75M in EC:DEC (3:7). (EC=Ethylene carbonate/DEC=Diethylcarbonate)

The parameters of the above electrochemical cell are as follows:
- Average mass of active material (cathode)=7.5 mg cm$^2$;
- Average mass of active material (anode)=3.3 mg cm$^2$;
- Average current=26 mA·g$^{-1}$;
- Emin=2.8 V;
- Emax=4.0 V;
- C/5.

Figure 10:
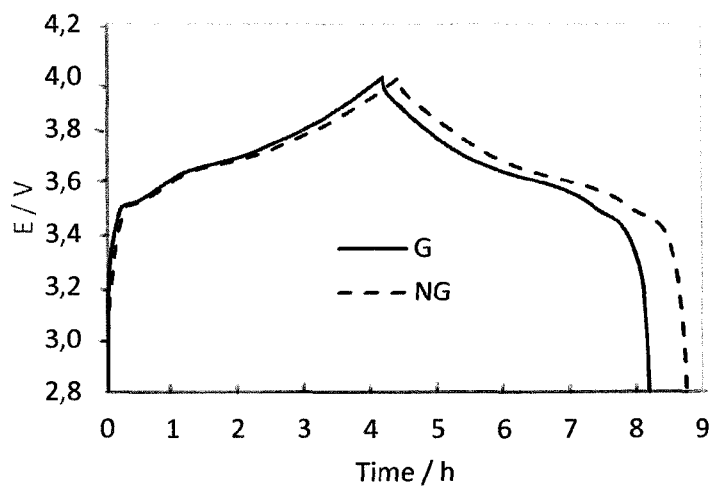
FIG. 10 shows curves of second galvanostatic cycle (voltage versus time) for battery of example 4 with functionalized (G) aluminum current collector compared to same battery with unfunctionalized (NG) aluminum current collector.

With the above electrochemical cell have been performed several galvanostatic cycles (voltage versus time):

FIG. 10 presents a comparison between the second galvanostatic cycle with a functionalized (NG) aluminum current collector.

It is noted that the capacitance of the battery is similar for both cells. The presence of a functionalized surface between the current collector and the cathode have therefore no negative influence on the battery capacity.

Figure 11:
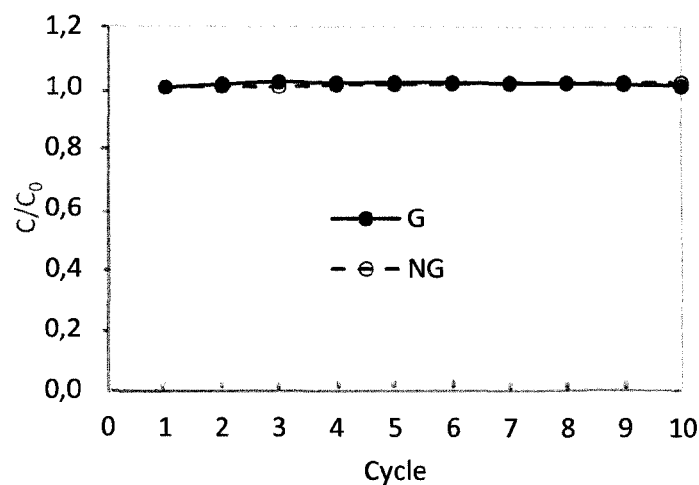
FIG. 11 shows the evolution of discharge capacity during the first 10 cycles for batteries of example 4 with functionalized (G) aluminum current collector compared to same battery with unfunctionalized (NG) aluminum current collector.

FIG. 11 shows that the functionalized surface of the cathode current collector have also no negative influence on cyclability of the electrochemical cell.

The invention claimed is:

1. Electrochemical device or photo-electrochemical device comprising;
    an electrolyte containing a bistriflimide anion, hereafter named as TFSI", at least two electrodes, each of these electrodes being in contact with a current collector comprising a metal support
    wherein at least one electrode has a current collector the metal support of which comprises an electro-active surface which is functionalized with linear or branched fluorinated carbon chains, such as perfluoroalkyl chains, in the form of a molecular layer which improves the corrosion resistance of said functionalized surface compared to a non-functionalized surface, wherein not impairing the passage of electrons between said electrode and its current collector, the functionalized surface being at the interface between said electrode and its current collector.

2. Electrochemical device or photo-electrochemical device according to claim 1, wherein the fluorinated carbon chains of the functionalized electro-active surface comprise perfluoroalkyl aryl moieties.

3. Electrochemical device or photo-electrochemical device according to claim 1, wherein the perfluoroalkyl aryl moiety is an aromatic cycle which is mono- or di- substituted by respectively one or two linear or branched perfluoroalkyl chain(s), preferably linear or branched perfluoro C1 to C20 alkyl chain(s), more preferably linear or branched perfluoro C1 to C10 alkyl chain(s).

4. Electrochemical device or photo-electrochemical device according to claim 1, wherein the linear or branched fluorinated carbon chain is a perfluoroalkyl chain chosen among the following groups: trifluoromethyl, perfluorohexyl and perfluorooctyl group.

5. Electrochemical device or photo-electrochemical device according to claim 1, wherein the metal support of the current collector is an aluminum substrate having a purity above 95%, preferably a purity equal or above 99% or an aluminum alloy comprising more than 95% Al, preferably more than 99% Al.

6. Electrochemical device or photo-electrochemical device according to claim 1, wherein the TFSI" containing electrolyte is a liquid electrolyte, preferably a mixture of a salt containing the TFSI" anion, such as LiTFSI, NaTFSI, or NH4TFSI, and an organic solvent or mixture of organic solvents or the former salts dissolved in pure or diluted molten salt, known as ionic liquids.

7. Electrochemical device or photo-electrochemical device according to claim 1, wherein the TFSI" containing electrolyte is a solid electrolyte, preferably a polymer based electrolyte, preferably a mixture of a salt containing this anion, such as LiTFSI, NaTFSI, or NH4TFSI, and a polymer or mixture of polymer or a physical ionogel or a chemical ionogel comprising a silica matrix or a mixture of silica and a polymer matrix.

8. Electrochemical device or photo-electrochemical device according to claim 1 wherein said device is chosen among: an energy storage device, a lithium-ion, sodium-ion, magnesium-ion, a calcium-ion or an aluminum battery, an electrochemical capacitor so called supercapacitor, a lithium-ion or a sodium-ion capacitor, a hybrid device intermediate between battery and supercapacitor, a photo-battery, or an electro-chromic device.

9. Electrochemical device according to claim 1 wherein said device is a lithium-ion battery comprising
    a graphite anode with a copper current collector,
    a Nickel Manganese Cobalt cathode with a functionalized aluminum current collector, and
    LiTFSI 0.75 M in Ethylene carbonate:Diethylcarbonate as electrolyte.

10. Process for preparing the functionalized current collector of the electrochemical device or photo-electrochemical device of claim 1 comprising the following main steps:
    Providing a current collector for electrochemical devices, said current collector comprising a support with a metallic surface;

Polishing said metallic surface with a fine abrasive to remove any oxide layer, then washing said surface with an organic solvent under ultra-sonication to obtain a polished electro-active surface;

Functionalizing the polished electro-active surface by dipping said surface of the current collector in a solution comprising a diazonium salt of a perfluoroalkyl moiety, preferably a perfluoroalkyl aryl moiety, under reducing conditions of the diazonium salt, and obtaining an electro-active surface functionalized with the perfluoroalkyl aryl moiety, Optionally washing the functionalized surface with an organic solvent under ultra-sonication, to remove the non-functionalized molecules from the electro-active surface of the support.

11. Process according to claim 10 wherein the functionalized step is performed in an any one of an electrochemical cell, a photochemical cell, a heated cell or a sonicated cell, and/or with the help of a chemical reducer in said solution.

12. Process according to claim 10 wherein the polishing step is a dry polishing step.

13. Process according to claim 10 wherein the functionalizing step is performed in a chronoamperometric cell containing a solution comprising a diazonium salt of the functionalizing perfluoroalkyl aryl moiety, an auxiliary electrode, a reference electrode and said metallic support as working electrode, at a potential under the redox potential of said diazonium salt of the functionalizing perfluoroalkyl aryl moiety.

14. Process according to claim 13 wherein the auxiliary electrode of the chronoamperometric cell is an electronically conductive plate, and the working electrode of the chronoamperometric cell is said metallic support of the current collector made of an aluminum substrate having a purity above 95%, or made of an aluminum alloy comprising than 95% Al.

15. Process according to claim 14 wherein said aluminum substrate having a purity above 99%.

16. Process according to claim 14 wherein said aluminum alloy comprising than 99% Al.

* * * * *